(12) United States Patent
Miller et al.

(10) Patent No.: US 10,823,290 B2
(45) Date of Patent: Nov. 3, 2020

(54) PLATED SEALING SYSTEM FOR VEHICLE ASSEMBLY

(71) Applicant: FORD GLOBAL TECHNOLOGIES, LLC, Dearborn, MI (US)

(72) Inventors: Daniel Miller, Dearborn, MI (US); James Lawrence Swoish, Northville, MI (US); Asif Iqbal, Macomb, MI (US); Jeremy Samborsky, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 352 days.

(21) Appl. No.: 15/862,696

(22) Filed: Jan. 5, 2018

(65) Prior Publication Data
US 2018/0128375 A1    May 10, 2018

Related U.S. Application Data

(62) Division of application No. 14/640,358, filed on Mar. 6, 2015, now Pat. No. 9,879,781.

(51) Int. Cl.
*F16J 15/10* (2006.01)

(52) U.S. Cl.
CPC ........... *F16J 15/102* (2013.01); *F16J 15/104* (2013.01)

(58) Field of Classification Search
CPC .. H01M 2/08; H01M 2250/20; B60H 1/00278
USPC .......................................... 180/68.5; 277/640
See application file for complete search history.

(56) References Cited

U.S. PATENT DOCUMENTS

| 2,194,266 | A | 3/1940 | Herbert |
| 4,833,922 | A | 5/1989 | Frick et al. |
| 5,427,386 | A | 6/1995 | Breaker |
| 6,106,030 | A | 8/2000 | Nader et al. |
| 6,318,768 | B1 | 11/2001 | Gehres |
| 6,460,642 | B1 * | 10/2002 | Hirano ..................... B60K 6/40 180/65.1 |
| 6,933,440 | B2 * | 8/2005 | Ichikawa ............. H02G 3/0431 174/135 |
| 7,172,042 | B2 * | 2/2007 | Yamaguchi .............. B60K 6/48 180/65.1 |

(Continued)

FOREIGN PATENT DOCUMENTS

CN      201568103 U     9/2010
FR         2674929 A1   10/1992

OTHER PUBLICATIONS

Kopeliovich, Dimitri, Fabrication of Ceramic Matrix Composites by Polymer Infiltration and Pyrolysis (PIP) [online], [retrieved on Jun. 15, 2017]. Retrieved from the internet <URL:https://www.substech.com/dokuwik/doku.php?id=fabrication-of-ceramic_matrix_composites_bypolymer_infiltratoin_and_pyrolysis_pjp>.

(Continued)

*Primary Examiner* — Jeffrey J Restifo
(74) *Attorney, Agent, or Firm* — David B. Kelley; Carlson, Gaskey & Olds

(57) ABSTRACT

A sealing system includes an exterior plate, an interior plate, a first seal received against the exterior plate and configured to restrict moisture ingress through the exterior plate, and a second seal received against the interior plate and configured to restrict moisture ingress through the interior plate. The sealing system may be used to seal around tubing that extends through a vehicle battery enclosure.

15 Claims, 7 Drawing Sheets

(56) References Cited

U.S. PATENT DOCUMENTS

| | | | | |
|---|---|---|---|---|
| 7,799,456 | B2* | 9/2010 | Kim | H01M 2/0486 |
| | | | | 429/175 |
| 7,972,185 | B2* | 7/2011 | Kim | H01M 2/206 |
| | | | | 439/754 |
| 8,267,210 | B2* | 9/2012 | Jones | B60K 1/04 |
| | | | | 180/68.5 |
| 8,444,216 | B2* | 5/2013 | Yamaguchi | B60R 16/0207 |
| | | | | 296/208 |
| 8,993,155 | B2* | 3/2015 | Okutani | H01M 2/0482 |
| | | | | 429/162 |
| 9,490,613 | B2* | 11/2016 | Kato | H02G 1/00 |
| 9,879,781 | B2* | 1/2018 | Miller | F16J 15/104 |
| 9,947,908 | B2* | 4/2018 | Mack | H01M 2/1223 |
| 10,062,936 | B2* | 8/2018 | Miller | H01M 10/6556 |
| 10,312,490 | B2* | 6/2019 | Maguire | H01M 2/1077 |
| 10,333,131 | B2* | 6/2019 | Deng | H01M 2/30 |
| 10,414,265 | B2* | 9/2019 | Ishikawa | B60K 11/02 |
| 10,427,627 | B2* | 10/2019 | Fukazu | H02G 3/0468 |
| 10,439,182 | B2* | 10/2019 | Elison | B60L 50/64 |
| 10,543,795 | B2* | 1/2020 | DeKeuster | H01M 10/0525 |
| 10,601,088 | B2* | 3/2020 | Fees | H01M 10/48 |
| 2006/0082072 | A1 | 4/2006 | Henry | |
| 2010/0013220 | A1 | 1/2010 | Rao et al. | |
| 2013/0241160 | A1 | 9/2013 | Ilkhanov et al. | |
| 2014/0090476 | A1 | 4/2014 | Miller et al. | |
| 2015/0252903 | A1 | 9/2015 | Boyd et al. | |

OTHER PUBLICATIONS

Notification of First Office Action for CN Application No. 2016100975566 dated Sep. 25, 2019.
Notification of Second Office Action for CN Application No. 2016100975566 dated May 27, 2020.
Notification of Third Office Action, Chinese Application No. 2016100975566 dated Sep. 11, 2020.
Fundamentals of Mechanical Design, Ma Aibing, et al, Beijing Institute of Technology Press dated Dec. 31, 2012.

* cited by examiner

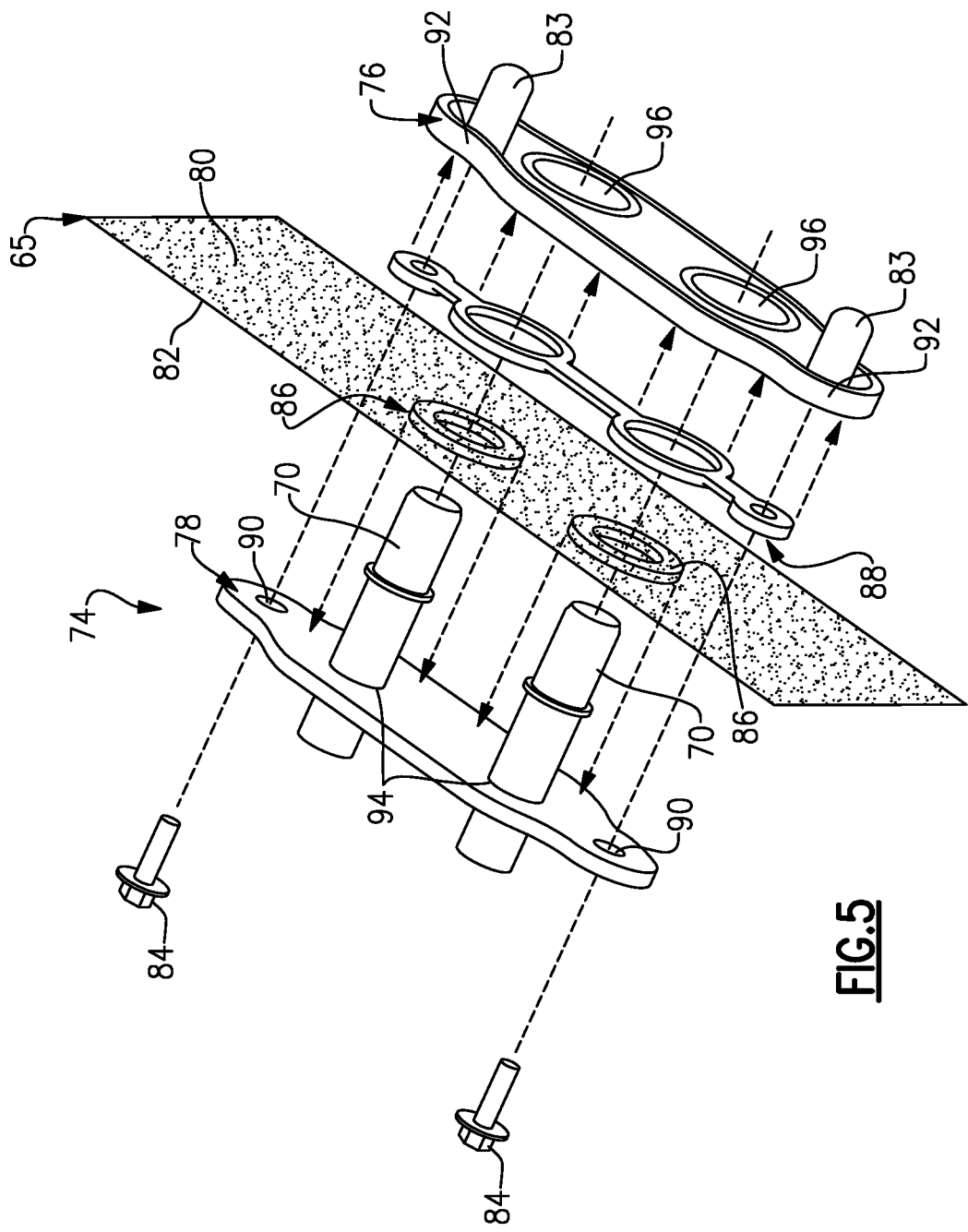

PLATED SEALING SYSTEM FOR VEHICLE ASSEMBLY

CROSS-REFERENCE TO RELATED APPLICATIONS

This is a divisional of U.S. patent application Ser. No. 14/640,358, which was filed on Mar. 6, 2015.

TECHNICAL FIELD

This disclosure relates to a vehicle assembly for an electrified vehicle. The vehicle assembly includes a sealing system configured to restrict moisture ingress through a wall of the assembly.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on the internal combustion engine to propel the vehicle.

Numerous vehicle assemblies are employed to house components of electrified vehicles. One example of such an assembly is the battery assembly, which houses a plurality of battery cells that are employed to power electric machines and other electric loads of the electrified vehicle. It may be desirable to restrict moisture ingress into an interior of the vehicle assembly.

SUMMARY

A sealing system according to an exemplary aspect of the present disclosure includes, among other things, an exterior plate, an interior plate, a first seal received against the exterior plate and configured to restrict moisture ingress through the exterior plate and a second seal received against the interior plate and configured to restrict moisture ingress through the interior plate.

In a further non-limiting embodiment of the foregoing system, tubing is received through the exterior plate and the interior plate.

In a further non-limiting embodiment of either of the foregoing systems, the tubing is received through openings that extend through each of the exterior plate and the interior plate, the first seal and the second seal both positioned about the tubing.

In a further non-limiting embodiment of any of the foregoing systems, the system includes fasteners that secure the exterior plate relative to the interior plate.

In a further non-limiting embodiment of any of the foregoing systems, the fasteners are received through peripheral openings formed in both the exterior plate and the interior plate.

In a further non-limiting embodiment of any of the foregoing systems, the peripheral openings of the exterior plate open into caps, the caps having internal threads for engaging the fasteners.

In a further non-limiting embodiment of any of the foregoing systems, the first seal is a peripheral seal and the second seal is an O-ring seal.

In a further non-limiting embodiment of any of the foregoing systems, the first seal is a polymer infiltration and pyrolysis (PIP) seal and the second seal is a rubber seal.

In a further non-limiting embodiment of any of the foregoing systems, the exterior plate includes a recessed surface, and the first seal is received within the recessed surface.

In a further non-limiting embodiment of any of the foregoing systems, the interior plate includes a recessed surface, and the second seal is received within the recessed surface.

A vehicle assembly according to another exemplary aspect of the present disclosure includes, among other things, an enclosure including a wall, a sealing system mounted to the wall and including an exterior plate contiguous with an exterior surface of the wall, an interior plate contiguous with an interior surface of the wall, and a seal disposed between the exterior plate and the interior plate. Tubing extends through the interior plate, the wall and the exterior plate.

In a further non-limiting embodiment of the foregoing assembly, the seal is a peripheral seal.

In a further non-limiting embodiment of either the foregoing assemblies, the seal is an O-ring seal.

In a further non-limiting embodiment of any of the foregoing assemblies, the seal is a peripheral seal and comprising a second seal that is an O-ring seal.

In a further non-limiting embodiment of any of the foregoing assemblies, the seal is disposed about the tubing and is configured to restrict moisture ingress through an opening of the wall.

A vehicle according to another exemplary aspect of the present disclosure includes, among other things, a plurality of battery cells, an enclosure that houses the plurality of battery cells, a cold plate in contact with the plurality of battery cells and a sealing system mounted to a wall of the enclosure and configured to seal around tubing that extends from the cold plate, through the sealing system and the wall, to an exterior of the enclosure.

In a further non-limiting embodiment of the foregoing vehicle, the tubing extends along a linear axis that excludes any bends.

In a further non-limiting embodiment of either of the foregoing vehicles, the sealing system includes an exterior plate, an interior plate, O-ring seals, and a peripheral seal.

In a further non-limiting embodiment of any of the foregoing vehicles, the exterior plate is received against an exterior surface of the wall and the interior plate is received against an interior surface of the wall.

In a further non-limiting embodiment of any of the foregoing vehicles, the O-ring seals are positioned around the tubing between the interior plate and the wall and the peripheral seal is positioned around the tubing between the exterior plate and the wall.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5 illustrates an exploded view of a sealing system of a vehicle assembly.

DETAILED DESCRIPTION

This disclosure details a plated sealing system for a vehicle assembly. The sealing system may include an exterior plate, an interior plate and one or more seals positioned between the exterior plate and the interior plate. In some embodiments, the sealing system is part of a vehicle assembly that includes an enclosure having a wall and tubing extending through the interior plate, the wall, and the exterior plate. The sealing system restricts moisture ingress through the plates and the wall into an interior of the enclosure. In other embodiments, the vehicle assembly is a battery assembly that includes a plurality of battery cells and a cold plate in contact with the battery cells. The sealing system seals the tubing-to-wall interface of the assembly to restrict moisture ingress inside the battery assembly. These and other features are discussed in greater detail in the following paragraphs of this detailed description.

Figure 1:
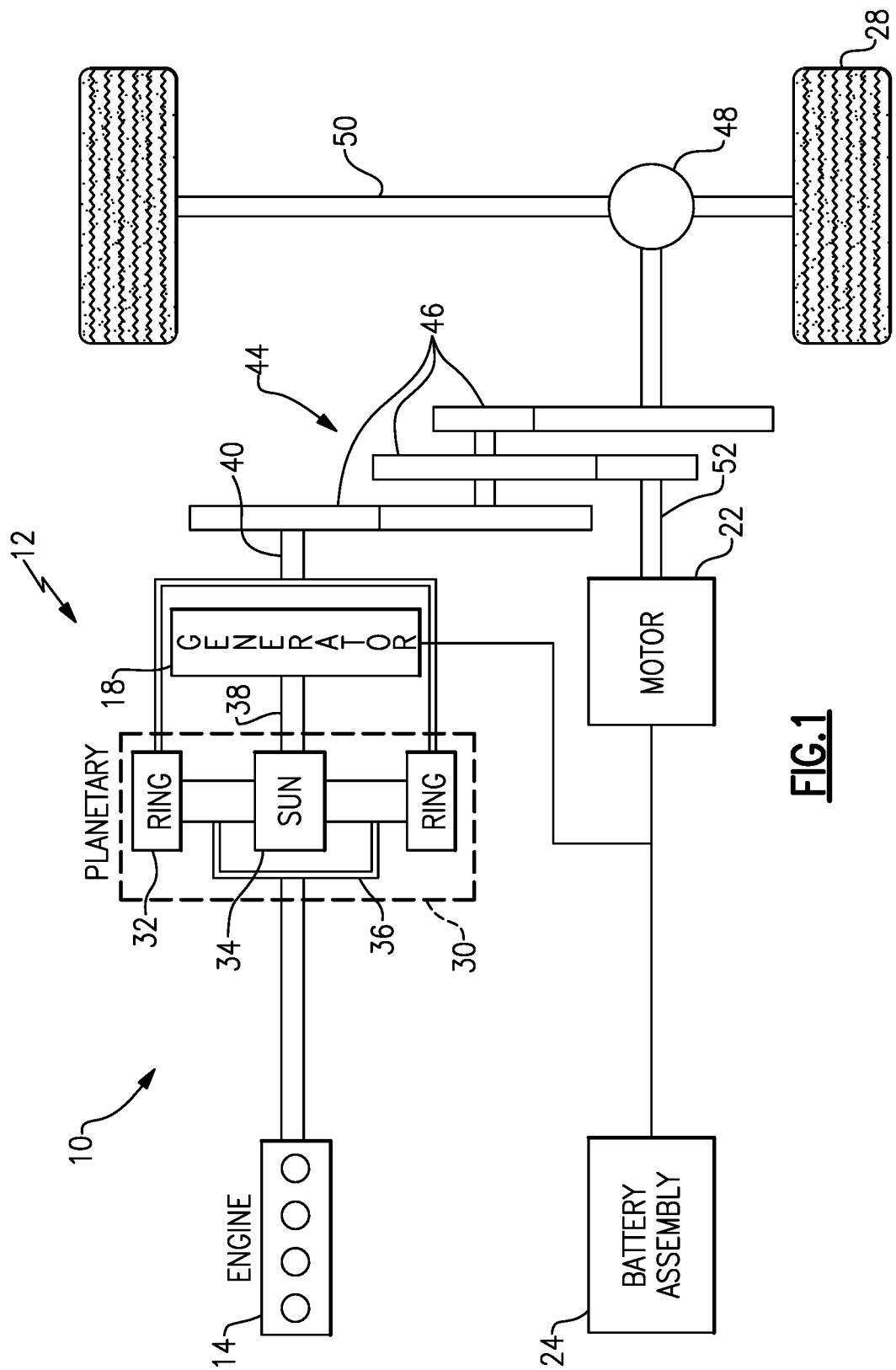
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery arrays, or groupings of battery cells, capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
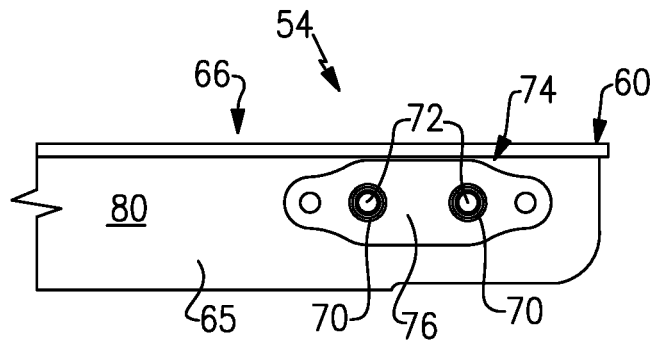
FIG. 2 is an outside view of a vehicle assembly.
Figure 3:
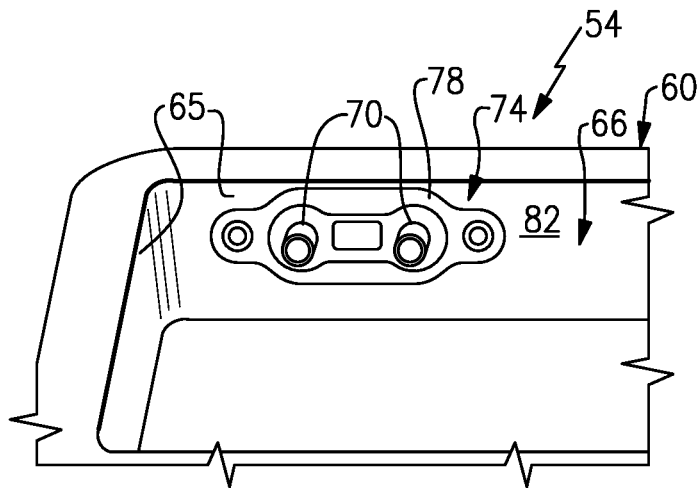
FIG. 3 is an inside view of the vehicle assembly of FIG. 2.
Figure 4:
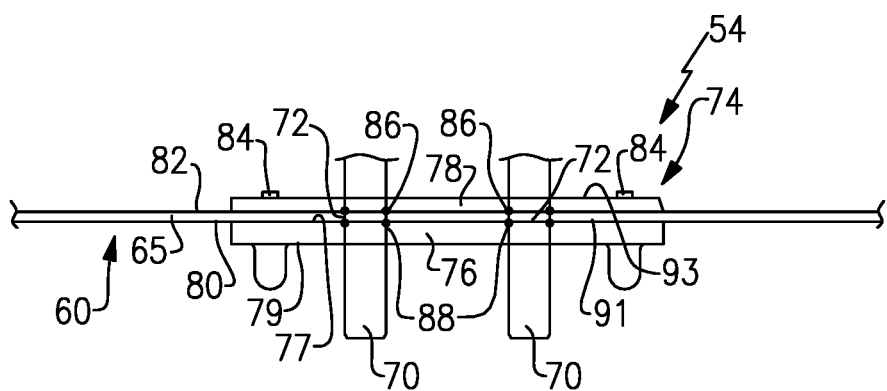
FIG. 4 illustrates a top view of the vehicle assembly of FIG. 2.

FIGS. 2, 3 and 4 illustrate portions of a vehicle assembly 54 that can be incorporated into an electrified vehicle. For example, the vehicle assembly 54 could be employed within the electrified vehicle 12 of FIG. 1. The vehicle assembly 54 could be any assembly that requires sealing to restrict moisture ingress into the vehicle assembly 54. In one non-limiting embodiment, the vehicle assembly 54 is a high voltage traction battery assembly for an electrified vehicle (see, for example, the embodiment of FIG. 9).

The vehicle assembly 54 includes an enclosure 60 that defines an interior 66 for housing one or more vehicle components. The enclosure 60 includes a plurality of walls 65 that surround the interior 66. The enclosure 60 may encompass any size, shape or configuration. That is, the enclosure 60 is not limited to the specific configuration shown in FIGS. 2 and 3. For example, although shown with an open top in FIGS. 2 and 3, another wall 65 could extend along the top of the enclosure 60 to cover the vehicle components housed in the interior 66.

Tubing 70 may extend through one of the walls 65 of the enclosure 60. The tubing 70 may extend within openings 72 formed through the wall 65. The tubing 70 may connect between components inside the enclosure 60 and components exterior from the enclosure 60, such as to communicate fluids between the interior 66 and the exterior. The openings 72 are holes formed through the wall 65 and therefore must be sealed to prevent moisture from entering the interior 66 of the enclosure 60. A sealing system 74 may therefore be mounted to the wall 65 to seal any leakage paths created by the openings 72.

In one embodiment, the sealing system 74 includes an exterior plate 76 and an interior plate 78. The exterior plate 76 is contiguous with an exterior surface 80 of the wall 65 (see FIG. 2), and the interior plate 78 is contiguous with an interior surface 82 of the wall 65 (see FIG. 3). A portion of the wall 65 is sandwiched between the exterior plate 76 and the interior plate 78. The tubing 70 extends through the interior plate 78, then through the wall 65, and then through the exterior plate 76 to communicate between the interior 66 and the exterior of the enclosure 60 (best illustrated in FIG. 4). As further discussed below, the sealing system 74 may include numerous mechanisms for sealing any leakage paths that exist through the wall 65.

FIG. 5, with continued reference to FIGS. 2, 3 and 4, further illustrates the sealing system 74. The sealing system 74 may include the exterior plate 76, the interior plate 78, fasteners 84 (two shown), O-ring seals 86 (two shown) and a peripheral seal 88. As stated above, the exterior plate 76 is configured for attachment to an exterior surface 80 of the wall 65 and the interior plate 78 is configured for attachment to an interior surface 82 of the wall 65. In one non-limiting embodiment, the exterior plate 76 and the interior plate 78 are cast, aluminum plates and may take any size or shape.

The fasteners 84 secure the interior plate 78 relative to the exterior plate 76. For example, the fasteners 84 may be tightened to secure the exterior plate 76 and the interior plate 78 together on opposing sides of the wall 65 (see FIG. 4). In one embodiment, the fasteners 84 may be received in a direction from the interior surface 82 toward the exterior surface 80 of the wall 65. The fasteners 84 are received through peripheral openings 90 of the interior plate 78 and peripheral openings 92 of the exterior plate 76. In one non-limiting embodiment, the fasteners 84 are bolts, although other types of fasteners are also contemplated. The sealing system 74 may utilize any amount of fasteners 84 to secure the interior plate 78 relative to the exterior plate 76.

In one embodiment, the O-ring seals 86 are rubber seals. One suitable rubber material includes ethylene propylene diene monomer. However, other materials are also contemplated. The sealing system 74 may utilize any amount of O-ring seals 86 and not necessarily just the two that are shown in FIG. 5. The peripheral seal 88 may be a polymer infiltration and pyrolysis (PIP) seal that is fabricated using ceramic matrix composites that include a low viscosity polymer infiltrated into a ceramic structure. The O-ring seals 86 are received over the tubing 70 (e.g., one seal per tube) and abut against the interior plate 78 (i.e., the O-ring seals 86 are positioned on a first side of wall 65), whereas the peripheral seal 88 is received against the exterior plate 76 (i.e., the peripheral seal 88 is positioned on a second, opposite side of the wall 65 from the O-ring seals 86, as shown in FIG. 4). In another embodiment, the O-ring seals 86 could be replaced by a one-piece rubber seal or another PIP seal.

The tubing 70 is sized to extend through openings 94 of the interior plate 78 and openings 96 of the exterior plate 76. In one non-limiting embodiment, the tubing 70 may be fixedly secured to the exterior plate 76 and the interior plate 78. Suitable attachment methodologies include, but are not limited to, brazing, welding, gluing and soldering.

Figure 6A:
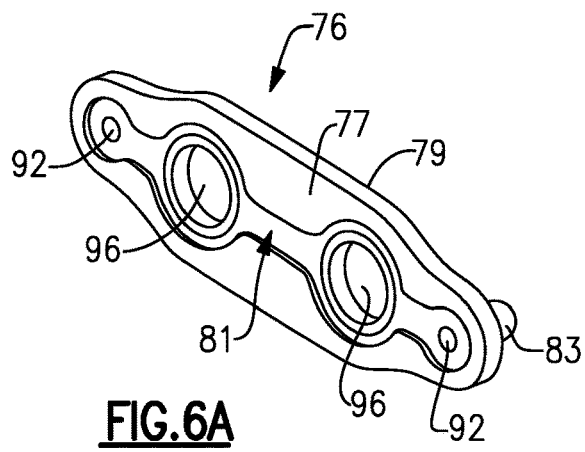
FIGS. 6A, 6B and 6C illustrate an exterior plate of the sealing system of FIG. 5.
Figure 6B:
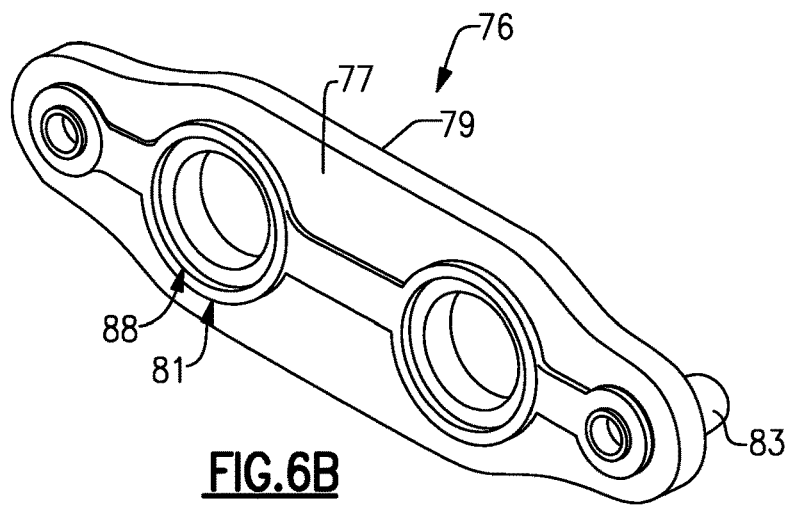
Figure 6C:
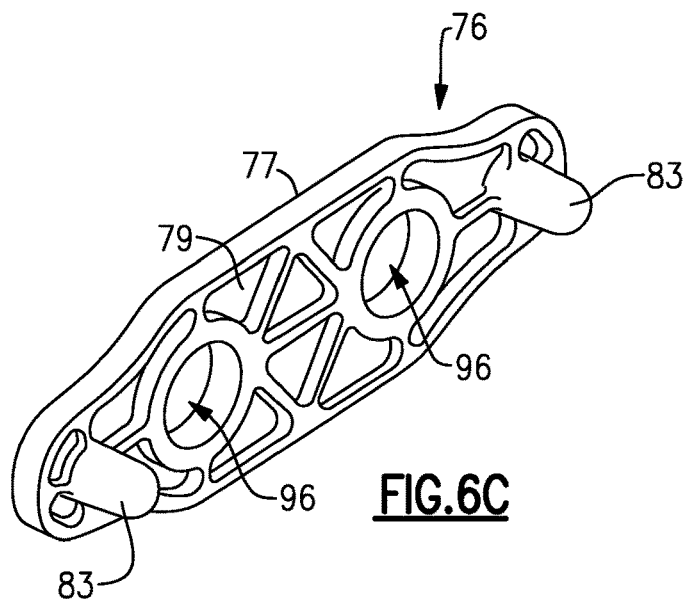

FIGS. 6A, 6B and 6C illustrate additional features of the exterior plate 76. The exterior plate 76 includes a first face 77 and an opposing second face 79. Once installed, the first face 77 of the exterior plate 76 abuts the exterior surface 80 of the wall 65 and the second face 79 faces away from the wall 65 (see FIG. 4).

The first face 77 may include a recessed surface 81. The recessed surface 81 is sized and shaped to receive the peripheral seal 88. In one embodiment, the shape of the recessed surface 81 matches the shape of the peripheral seal 88. As best shown in FIG. 6B, the peripheral seal 88 protrudes slightly outwardly from the recessed surface 81 such that a portion of the peripheral seal 88 extends above the first face 77. The peripheral seal 88 seals around a periphery of the exterior plate 76, including around both the peripheral openings 92 and the openings 96.

The peripheral openings 92 and the openings 96 extend through the exterior plate 76. In one embodiment, the peripheral openings 92 and the openings 96 extend through the first face 77 and the second face 79. The peripheral openings 92 open into caps 83 that protrude from the second face 79. In one embodiment, the caps 83 are closed-ended and include internal threading for engaging the fasteners 84 (see FIG. 5) of the sealing system 74.

Figure 7:
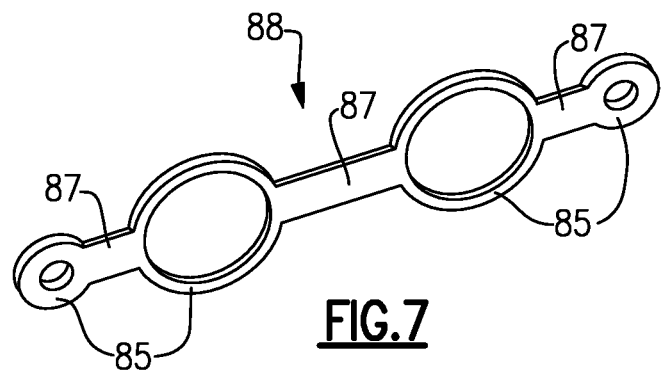
FIG. 7 illustrates an interior plate of the sealing system of FIG. 5.

FIG. 7 further illustrates the peripheral seal 88 of the sealing system 74 of FIG. 5. The peripheral seal 88 includes a plurality of rings 85 and arms 87 that connect between adjacent rings 85. The rings 85 seal around the peripheral openings 92 and the openings 96 of the exterior plate 76, which is shown in FIGS. 6A, 6B and 6C, to restrict moisture ingress. That is, the rings 85 of the peripheral seal 88 seal any leakage path that may exist through the peripheral openings 92 and the openings 96.

Figure 8:
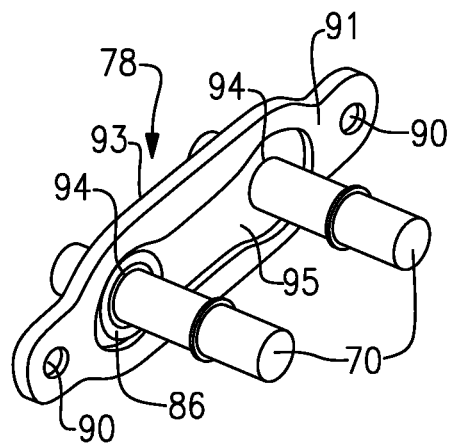
FIG. 8 illustrates a seal of the sealing system of FIG. 5.

FIG. 8 further illustrates the interior plate 78 of the sealing system 74 of FIG. 5. The interior plate 78 includes a first face 91 and an opposing second face 93. Once installed, the first face 91 of the interior plate 78 abuts the interior surface 82 of the wall 65, whereas the second face 93 faces toward the interior 66 of the enclosure 60 (see FIG. 4). The first face 91 may include a recessed surface 95. The recessed surface 95 is sized and shaped to receive one or more O-ring seals 86. The O-ring seals 86 seal around the openings 94 which receive the tubing 70. Both the peripheral openings 90 and the openings 94 extend through the interior plate 78 (i.e., extend through the first face 91 and the second face 93).

Figure 9:
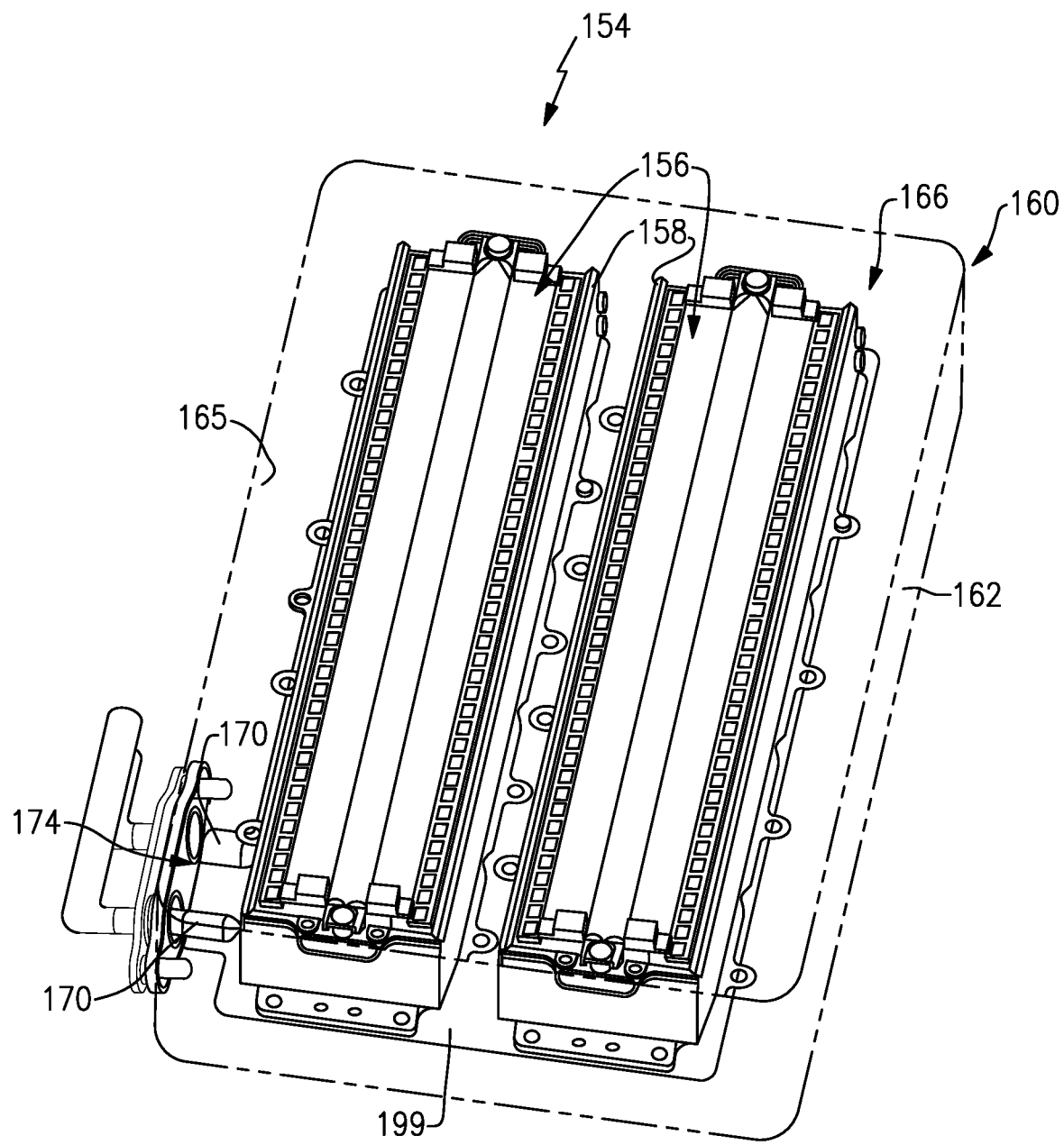
FIG. 9 illustrates a battery assembly that employs a plated sealing system.
Figure 10:
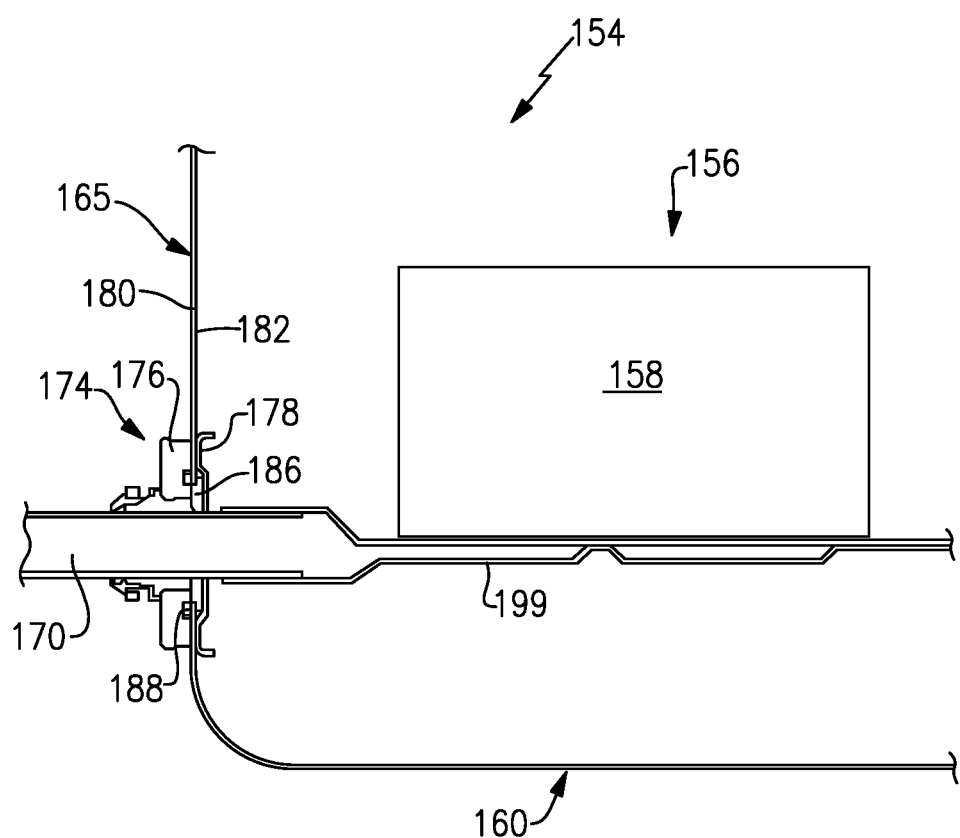
FIG. 10 is a cross-sectional view of the battery assembly of FIG. 9.

FIGS. 9 and 10 illustrate a battery assembly 154 for use in an electrified vehicle. The battery assembly 154 is one non-limiting example of a vehicle assembly that may benefit from the teachings of this disclosure. The exemplary battery assembly 154 includes battery arrays 156, which can be described as groupings of battery cells 158, for supplying electrical power to various vehicle components. Although two battery arrays 156 are illustrated in FIG. 9, the battery assembly 154 could include a single battery array or multiple battery arrays within the scope of this disclosure. In other words, this disclosure is not limited to the specific configuration shown in FIG. 9.

Each battery array 156 includes a plurality of battery cells 158 that may be stacked side-by-side along a span length of each battery array 156. Although not shown in the highly schematic depictions of FIGS. 9-10, the battery cells 158 may be electrically connected to one another using busbar assemblies. In one embodiment, the battery cells 158 are prismatic, lithium-ion cells. However, battery cells having other geometries (cylindrical, pouch, etc.) and/or other chemistries (nickel-metal hydride, lead-acid, etc.) could alternatively be utilized within the scope of the disclosure.

An enclosure 160 (shown in phantom in FIG. 9) surrounds the battery arrays 156). The enclosure 160 defines an interior 166 for housing the battery arrays 156 and, potentially, other components of the battery assembly 154. In one non-limiting embodiment, the enclosure 160 includes a tray 162 and a cover 164 which establish a plurality of walls 165 that surround the interior 166.

During some conditions, heat may be generated by the battery cells 158 of the battery arrays 156 during charging and discharging operations. Heat may also be transferred into the battery cells 158 during vehicle key-off conditions as a result of relatively hot ambient conditions. During other conditions, such as relatively cold ambient conditions, the battery cells 158 may need heated. A cold plate 199 may therefore be utilized as part of a thermal management system for thermally conditioning (i.e., heating or cooling) the battery cells 158.

In one non-limiting embodiment, the battery arrays 156 of the battery assembly 154 are positioned atop the cold plate 199 so that the cold plate 199 is in contact with the bottom surface of each battery cell 158. A fluid may be circulated through the cold plate 199 to either add or remove heat to/from the battery assembly 154. Tubing 170 provides a conduit for communicating the fluid into and out of the cold plate 199. In one embodiment, the tubing 170 protrudes through one of the walls 165 of the enclosure 160 for connection to other thermal management components.

In one non-limiting embodiment, the tubing 170 extends laterally away from an edge of the cold plate 199 and extends along a completely linear axis (i.e., excludes any bends). The tubing 170 extends through one of the walls 165, which in this example is a side wall of the enclosure 160. The battery assembly 154 may include a sealing system 174 that seals around the tubing 170 at locations where the tubing 170 protrudes through the wall 165.

Referring now primarily to FIG. 10, the sealing system 174 may include an exterior plate 176, an interior plate 178, a first seal 186 and a second seal 188. The exterior plate 176 is secured at an exterior surface 180 of the wall 165 and the interior plate 178 is secured at an interior surface 182 of the wall 165. Both the first seal 186 and the second seal 188 may be positioned between the exterior plate 176 and the interior plate 178. In one embodiment, the first seal 186 is positioned around the tubing 170 and is positioned axially between the interior surface 182 of the wall 165 and the interior plate 178 and the second seal 188 is positioned axially between the exterior surface 180 of the wall 165 and the exterior plate 176.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
   a plurality of battery cells;
   an enclosure that houses said plurality of battery cells;
   a liquid cooled cold plate housed inside the enclosure and positioned in contact with said plurality of battery cells; and
   a sealing system mounted to a wall of said enclosure and configured to seal around tubing that extends from said cold plate, through each of said sealing system and said wall, and to an exterior of said enclosure.

2. The vehicle as recited in claim 1, wherein said tubing extends along a linear axis that excludes any bends.

3. A vehicle, comprising:
   a plurality of battery cells;
   an enclosure that houses said plurality of battery cells;
   a cold plate in contact with said plurality of battery cells; and
   a sealing system mounted to a wall of said enclosure and configured to seal around tubing that extends from said cold plate, through each of said sealing system and said wall, and to an exterior of said enclosure,
   wherein said sealing system includes an exterior plate, an interior plate, O-ring seals, and a peripheral seal.

4. The vehicle as recited in claim 3, wherein said exterior plate is received against an exterior surface of said wall and said interior plate is received against an interior surface of said wall.

5. The vehicle as recited in claim 4, wherein said O-ring seals are positioned around said tubing between said interior plate and said wall and said peripheral seal is positioned around said tubing between said exterior plate and said wall.

6. The vehicle as recited in claim 3, comprising a fastener received through an opening in said exterior plate, said interior plate, and said peripheral seal.

7. The vehicle as recited in claim 3, wherein said peripheral seal is a polymer infiltration and pyrolysis (PIP) seal and said O-ring seals are rubber seals.

8. The vehicle as recited in claim 3, wherein said peripheral seal includes a plurality of rings and arms that connect between adjacent rings of said plurality of arms.

9. The vehicle as recited in claim 3, wherein said exterior plate includes peripheral openings that open into caps.

10. The vehicle as recited in claim 9, wherein said caps include internal threads configured to engage a fastener received through said peripheral openings.

11. A vehicle, comprising:
a battery enclosure;
a sealing system including:
an exterior plate received against an exterior wall of said battery enclosure;
a first seal between said exterior wall and said exterior plate;
an interior plate received against an interior wall of said battery enclosure;
a second seal between said interior wall and said interior plate; and
a tube extending through said exterior plate, said first seal, said interior plate, and said second seal.

12. The vehicle as recited in claim 11, wherein said first seal is a polymer infiltration and pyrolysis (PIP) seal and said second seal is a rubber seal.

13. The vehicle as recited in claim 11, comprising a fastener received through said interior plate, said interior wall, said exterior wall, and said exterior plate.

14. The vehicle as recited in claim 11, wherein said first seal includes a first ring, a second ring, and an arm connecting between said first ring and said second ring.

15. The vehicle as recited in claim 11, wherein said first seal is received within a recessed surface of said exterior plate.

* * * * *